United States Patent [19]

Merkt

[11] Patent Number: 4,648,733

[45] Date of Patent: Mar. 10, 1987

[54] DEVICE FOR PRODUCING AN INSTALLATION TEMPLATE FOR CONDUITS, ESPECIALLY CONDUITS FOR HYDRAULIC OR PNEUMATIC CONTROL OR PROCESS CIRCUITS

[76] Inventor: Robert Merkt, Am Sportplatz, 5441 Bell, Fed. Rep. of Germany

[21] Appl. No.: 754,519

[22] Filed: Jul. 12, 1985

[30] Foreign Application Priority Data

Jul. 14, 1984 [DE] Fed. Rep. of Germany ....... 3426024

[51] Int. Cl.$^4$ ............................................. F16C 11/06
[52] U.S. Cl. ..................................... 403/56; 403/141;
138/120
[58] Field of Search ................... 403/56, 141; 138/120;
248/276

[56] References Cited

U.S. PATENT DOCUMENTS

| | | | |
|---|---|---|---|
| 809,977 | 1/1906 | O'Brien | 138/120 |
| 1,276,117 | 8/1918 | Riebe | 138/120 X |

FOREIGN PATENT DOCUMENTS

| | | | |
|---|---|---|---|
| 198143 | 6/1958 | Austria | 403/141 |
| 1098836 | 3/1955 | France | 138/120 |

Primary Examiner—Andrew V. Kundrat
Attorney, Agent, or Firm—Becker & Becker, Inc.

[57] ABSTRACT

A device for producing an installation template for conduits, especially conduits for hydraulic or pneumatic switching or operating circuits. The device includes a plurality of relatively short articulated elements that are connected or connectable to one another. Adjacent articulated elements can be respectively moved relative to one another about a common geometrical point of rotation and within a predetermined spatial angle, and can be fixed in any possible position relative to one another. In addition, the device has end pieces that are associated with the articulated elements and are connected or can be connected to the latter, with these end pieces being provided with connectors for rod elements. Finally, the device has rod elements that are several times longer than the articulated elements, and that are provided with connectors that correspond to the connectors on the end pieces.

9 Claims, 4 Drawing Figures

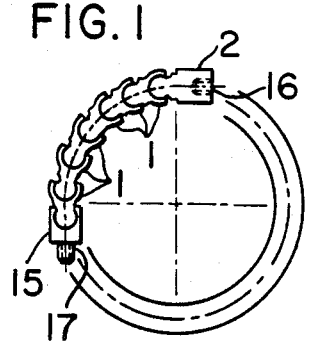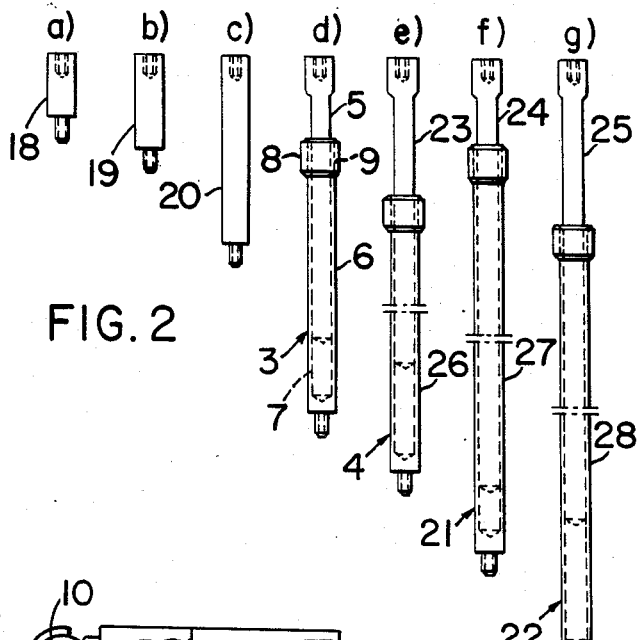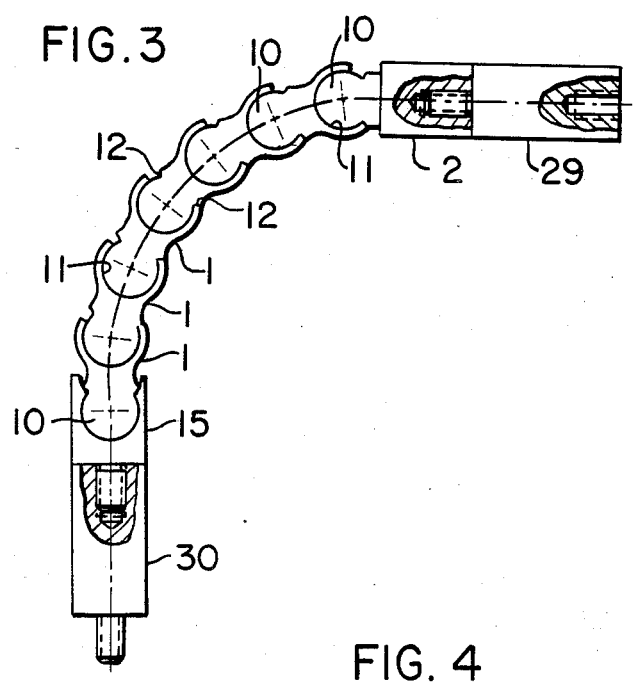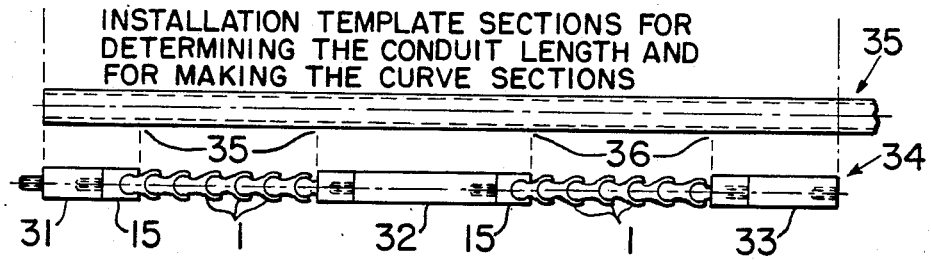
FIG. 4 — INSTALLATION TEMPLATE SECTIONS FOR DETERMINING THE CONDUIT LENGTH AND FOR MAKING THE CURVE SECTIONS

DEVICE FOR PRODUCING AN INSTALLATION TEMPLATE FOR CONDUITS, ESPECIALLY CONDUITS FOR HYDRAULIC OR PNEUMATIC CONTROL OR PROCESS CIRCUITS

FIELD OF THE INVENTION

1. Background of the Invention

The present invention relates to a device that is used to produce an installation template or guide for pipe runs or conduits, especially conduits for hydraulic or pneumatic control or process circuits.

2. Description of the Prior Art

In many areas of technology it is now customary to operate machinery—including control devices—with a gaseous or liquid pressure medium. In this regard, air or a suitable hydraulic fluid are used in particular as the pressure medium. Areas of use for pressure-medium-driven control or process circuits are, for example, the motor vehicle industry, in particular for trucks and work vehicles, as well as processing and working machinery of various kinds.

During the assembly of such pneumatic of hydraulic control, switching, or process circuits or runs, it is sometimes necessary—for technical and sometimes even aesthetic reasons—to match the conduits for the pressure medium to different structural conditions, such as, for example, the shape of adjacent machinery or devices. During the assembly of such pressure-medium-driven switching or process circuits, this is effected by bending conduit sections of sufficient length into shape while constantly matching them against the relevant shapes of the areas of machinery that have to be traversed; this is done in order to arrive at the desired shape of the conduit in the most effective manner. Such work demands a great deal of practice and experience, and also takes up a great deal of time. In the case of complicated conduit runs, particularly when such runs pass through three dimensions, such complexities often lead to the fact that conduits that could in effect be made up in a single piece, e.g., between a control element and a machine, are in fact made up in several pieces, which are then joined together by means of connectors. The assembly of such pressure-medium-driven systems is made even costlier when this is done and, in addition, the unnecessary connectors also result in potential areas for failures.

An object of the present invention is to simplify the assembly of even complex conduit systems for pressure-medium-driven switching or operating circuits, and to improve such assembly from the point of view of lower requirements for time and material.

SUMMARY OF THE INVENTION

According to the present invention, to realize this object, a device that is used to produce an assembly template for conduits, especially conduits for hydraulic or pneumatic control or operating circuits, is proposed, this device being characterized by a plurality of articulated elements that are short relative to length, and are connected to one another or are connectable to one another; adjacent elements are movable relative to one another about a common geometrical point of rotation, within a prescribed spatial angle, and can be fixed in any possible position relative to one another by clamping; the device is also characterized by end pieces that are or can be connected to the articulated elements, these end pieces being provided with connectors for rod elements; and the device finally has rod elements having a length that is a multiple of the diameter, said rod elements being provided with connectors that cooperate with the connectors on the end pieces.

Using the device proposed by the present invention, it is possible to produce an assembly template for conduits that are required for pressure-mediumdriven switching or process circuits, and to do this in the simplest possible manner and in the shortest possible time. The inventive template meets all the requirements of trade practices, and permits the production of such conduits in a manner that satisfies the technical, space, and aesthetic demands in the best possible manner. In this connection, all that is required is to combine an appropriate number of the flexible and the rigid elements, namely the articulated elements as well as the end pieces and rod elements, in conformity to the length of the desired run of the conduit section that is to be fabricated, starting from the desired point on the machine in question. the extended length of a template assembled in this manner can correspond to the commercially available, e.g. 6-meter, maximum length of such conduit. The articulated elements, which snap together and can be kept in position by suitable clamping, can be assembled to form appropriate quarter or half circles having a minimal average radius of, for example, five centimeters.

Once the installation template has been completed, it is necessary only to extend it in order to permit conduit of the proper length to be cut to the precise length of the template. The end pieces of the areas of the chains made of articulated members then mark the exact locations of the appropriate conduit that has to be curved.

In an advantageous development of the invention, it is proposed that the rod elements comprise two parts that telescope one inside the other, it being possible to lock these parts relative to one another in various possible positions by means of a clamping device. This means it is possible to adjust the length of the straight sections of the installation template exactly to the desired size. In a further development of the aforementioned proposal, an expedient further configuration is provided by having the two-part rod elements comprise a rod portion and a sleeve portion, and, in order to secure the rod and the sleeve portions relative to one another, by having a lock nut on that end of the sleeve portion adjacent to the rod portion, with this lock nut cooperating with a corresponding threaded portion that is provided with at least one longitudinal slit. This embodiment can be produced relatively inexpensively, and permits simple and rapid adjustment of the length of the rod portion through a relatively large range of lengths.

In order to define a minimal radius of curvature for a chain of articulated elements, and in order to restrict the possible movement of adjacent articulated elements relative to one another, the articulated elements have ball sections and sockets; a circular shoulder that extends around the ball section serves to restrict the possible angle of movement of the outer edge of the socket.

In order that a chain produced by using the articulated elements can be kept in the shape required, and within the range of possible movements, during the time required to produce the installation template, it is proposed that the sockets of an articulated element be placed under tension on the ball section of the adjacent articulated element.

According to a further proposal, threaded pins and threaded holes are used as connectors for the rod elements and the end pieces.

The inventive device is preferably produced from a suitable plastic, preferably polyamide.

The solution provided previously can be further improved in that the ball portions and/or sockets of the articulated elements can be slit.

BRIEF DESCRIPTION OF THE DRAWING

The present invention is explained in greater detail in conjunction with the embodiment illustrated in the drawing, as follows:

FIG. 1 is a view that shows a chain assembled from articulated elements;

FIGS. 2a to 2g are views that show various rod elements of different lengths, some being adjusable in length;

FIG. 3 is a view that shows the chain of articulated elements of FIG. 1, to a greater scale, together with rod elements secured to the end pieces; and FIG. 4 is a view that shows an installation template produced from the articulated elements and the rod elements of FIGS. 1 and 2, together with a conduit that is to be measured.

BRIEF DESCRIPTION OF THE PREFERRED EMBODIMENTS

FIG. 1 shows articulated elements 1, which are connected to one another to form a chain of elements that extends around a quarter-circle. The two ends of the chain formed from the articulated elements 1 are provided with the end pieces 2 and 15 respectively. A threaded hole 16 is provided in the end piece 2, and a threaded pin 17 is provided on the end piece 15.

FIGS. 2a to 2c show rod elements 18, 19 and 20 that cannot be adjusted in length, and adjustable two-part rod elements 3, 4, 21, and 22. The rod elements are also provided with threaded pins and holes, which correspond to the above-described threaded holes and threaded pins 15 and 16 respectively.

The rod elements 3, 4 and 21, 22 comprise a rod-like portion 5, 23, 24 or 25, and a sleeve-like portion 6, 26, 27 or 28 ; a lock nut 8 is on that end of the sleeve portion 6 adjacent to the rod portion 5, with which is associated a corresponding threaded area 9 having at least one slit 7 that extends in axial direction.

The chain of articulated elements of FIG. 1 is shown to an enlarged scale in FIG. 3. This chain comprises articulated elements 1 and end pieces 2 and 15, and furthermore comprises relatively short rod elements 29 and 30 that cannot be adjusted for length. These rod elements are removably connected by means of threaded pins or threaded holes (not shown in greater detail) to the appropriate end piece (end piece 2, 15 respectively).

One end of the articulate elements 1 is provided with a ball section 10, and the other end is provided with a socket 11. The socket 11 of a given articulated element 1 can be pressed onto the ball end 10 of a further articulated element 1, whereby the socket is then in contact with the ball section of the associated articulated element 1 under a certain amount of tension. The articulated elements are expediently made of plastic, in particular of polyamide. Furthermore, in this regard, it can be expedient to provide the ball sections and/or the sockets with slits so that the ball sections and the sockets have improved "spatial" elasticity so that, on the one hand, when the articulated elements are joined together, there is a relatively high tension between the ball and the socket, and on the other hand, however, it is possible to press the socket portion onto the ball portion with relatively little effort.

In order to restrict the spatial angle within which the socket of a given articulated element 1 can be rotated or pivoted about the geometrical center point of the associated other articulated element 1, there is provided in each instance a shoulder 12 in the vicinity of the ball 10 on the articulated element 1; the edge of the socket, not shown in greater detail, can rest against this shoulder.

FIG. 4 shows an installation template 34 produced by using articulated elements 1, end pieces 2 and 15, and various rod elements 31, 32, and 33. When extended, the installation template 34 makes it possible to arrive at the precise measurement of the length of a conduit 35, and in addition in particular permits marking of the conduit sections 35 and 36 that are to be bent to a specific shape.

The present invention is, of course, in no way restricted to the specific disclosure of the specification and drawings but also encompasses any modifications within the scope of the appended claims.

What I claim is:

1. A device to simplify assembly of even complex conduit systems for pressure-medium-driven switching or operating circuits for producing an installation template for conduits employed to arrive at precise measurement of length of said conduits and also to permit marking of conduit sections to be bent to a specific shape in motor vehicle industry as well as for processing and working machinery of various kinds, comprising:

a plurality of interconnectable articulated elements, each of which is relatively short compared to the length of said template; adjacent ones of said articulated elements can be respectively moved, relative to one another, about a common geometrical point of rotation and within a predetermined spatial angle;, said articulated elements can be fixed in any position relative to one another by clamping;

end pieces which are respectively connectable to given ones of said articulated elements; in addition, each of said end pieces is provided with connecting means on a side thereof remote from said articulated elements, with said given ones of said articulated elements each having a planar abutment surface for engagement with said end pieces; and rod elements, each of which has a length that is several times greater than its diameter; each of said rod elements is provided with connecting means for cooperating with said connecting means of said end pieces so that said articulated elements can be kept in position to conform to various installation requirements although readily adaptable different configurations of employment undertaken therewith.

2. A device according to claim 1, in which each of said articulated elements has a ball section and a socket, with said socket having an outer edge remote from said ball section, and with said ball section having a circular shoulder which cooperates with said outer edge of an adjacent socket of a different one of said articulated elements to effect said predetermination of the spatial angle of movement of said articulated elements relative to one another.

3. A device according to claim 2, in which the socket of a given articulated element is seated on the ball section of an adjacent articulated element under stress to effect said clamping for fixing the position of said articulated elements relative to one another.

4. A device according to claim 1, in which each of said rod elements and said end pieces is provided with connecting means in the form of at least one of a threaded pin and a threaded hole.

5. A device according to claim 1, in which said articulated elements, said end pieces, and said rod elements are made of plastic.

6. A device according to claim 5, in which said plastic is a polyamide resin.

7. A device according to claim 3, in which at least one of said ball section and said socket of a given articulated element is provided with at least one slit.

8. A device for producing an installation template for conduits, comprising:
- a plurality of interconnectable articulated elements, each of which is relatively short compared to the length of said template; adjacent ones of said articulated elements can be respectively moved, relative to one another, about a common geometrical point of rotation and within a predetermined spatial angle; said articulated elements can be fixed in any position relative to one another by clamping;
- end pieces which are respectively connectable to given ones of said articulated elements; in addition, each of said end pieces is provided with connecting means on a side thereof remote from said articulated elements;
- rod elements, each of which has a length that is several times greater than its diameter; each of said rod elements is provided with connecting means for cooperating with said connecting means of said end pieces; each of said rod elements comprising two telescoping parts, and clamping means for holding said parts in any position relative to one another.

9. A device according to claim 8, in which each of said two-part rod elements comprises a rod-like portion and a sleeve-like portion; that end of a given sleeve-like portion adjacent to a rod-like portion is provided with a threaded area having at least one slit that extends in the axial direction; said clamping means of a given rod element comprises a lock nut which cooperates with said threaded area.

* * * * *